Patented July 25, 1933

1,919,563

UNITED STATES PATENT OFFICE

GEORG KRÄNZLEIN AND WALTER BROEKER, OF FRANKFORT-ON-THE-MAIN-HOCHST, AND ARTHUR WOLFRAM, OF FRANKFORT-ON-THE-MAIN-RODELHEIM, GERMANY, ASSIGNORS TO GENERAL ANILINE WORKS, INC., OF NEW YORK, N. Y., A CORPORATION OF DELAWARE

PROCESS OF PREPARING 1-AMINO-10-ANTHRONES AND THE PRODUCTS OBTAINABLE THEREBY

No Drawing. Application filed July 8, 1932, Serial No. 621,518, and in Germany July 17, 1931.

The present invention relates to a new process of preparing 1-amino-10-anthrones and to the products obtainable thereby.

We have found that 1-amino-10-anthrones are obtainable in an easy manner and with a very good yield by acting with an acid condensing agent on a compound of the following general structure:

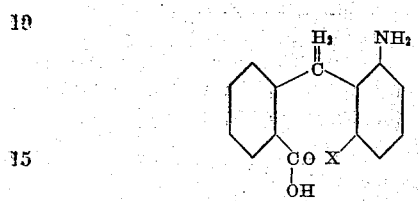

being unsubstituted in position X or a derivative or substitution product thereof.

As acid condensing agents there may be used preferably those as are known as ring-closing agents as, for instance, sulfuric acid of at least 70% strength, chlorsulfonic acid or aluminium chloride. The 1-amino-10-anthrones, thus obtained, are not identical to the amino-anthrones obtainable by reduction of alpha-amino-anthraquinones. The present process allows of obtaining well-defined 1-amino-10-anthrones which are of industrial importance and constitute valuable products for the manufacture of dyestuffs and dyestuff-intermediate products. The 1-amino-10-anthrones may be transformed into the corresponding anthraquinones when their alkaline solution is exposed to air or treated with an oxidizing agent.

It is surprising that the above described reaction occurs in such a smooth manner and with a very good yield of 1-amino-10-anthrones since the 2'-amino-2-benzoylbenzoic acid condenses extremely difficulty and only under special conditions with formation of 1-aminoanthraquinone. The easy course of the reaction is, furthermore, surprising in view of the fact that the ring closure must take place in meta-position to the amino group, i.e. in a position which in comparison to the ortho- and para-position is known to be difficulty accessible to reaction.

The products obtainable according to the present process are new, for instance, those of the following formula:

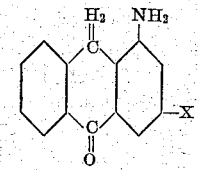

wherein X stands for hydrogen or alkyl.

The following examples serve to illustrate the invention, but they are not intended to limit it thereto, the parts being by weight:

(1) 80 parts of 2'-amino-2-benzylbenzoic acid are dissolved in 800 parts of sulfuric acid (96%) and heated for a quarter of an hour at about 60° C. to about 65° C. The reaction mixture is then poured into ice-water. The yellow-green precipitate obtained is filtered with suction and washed until neutral. After recrystallization from ortho-dichlorobenzene or xylene or chlorobenzene, the 1-amino-10-anthrone forms fine needles melting at 172° C. to 173° C. The product dissolves in concentrated sulfuric acid to a light yellow solution showing a weakly green fluorescence. In caustic soda solution it dissolves to a yellow solution. On exposure to air or on addition of an oxidizing agent, there separates from its alkaline solution alpha-aminoanthraquinone.

(2) 125 parts of the sodium salt of 2'-amino-2-benzylbenzoic acid are introduced into 1500 parts of sulfuric acid (90%) at about 25° C. to about 30° C. After the whole has been dissolved, it is heated for half an hour at about 70° C. The product is worked up as indicated in Example 1.

(3) 132 parts of the hydrochloride of 2'-amino-2-benzylbenzoic acid are introduced in small portions into 2000 parts of sulfuric acid (88%). As soon as hydrochloric acid is no longer precipitated and the whole has become dissolved, it is heated to about 70° C. to about 75° C. and stirred at this temperature for half an hour. The reaction product is worked up as described in Example 1.

(4) 55 parts of 2'-amino-2-benzylbenzoic acid are dissolved in 500 parts of sulfuric acid monohydrate and the whole is heated for 15 minutes at about 45° C. to about 50° C. The condensation product is obtained as described in Example 1.

(5) 55 parts of 2'-amino-2-benzylbenzoic acid are introduced in portions into 440 parts of chlorosulfonic acid, while cooling to about 0° C. to about 10° C., dissolved and the whole is stirred for 10 minutes at room temperature. After decomposition of the melt by means of ice, the 1-amino-10-anthrone is obtained as described in Example 1.

(6) Into a melt of 365 parts of aluminium chloride and 75 parts of sodium chloride there are introduced at about 120° C., 55 parts of 2'-amino-2-benzylbenzoic acid. The whole is molten for half an hour at about 120° C., to about 125° C., and then decomposed with ice-water. The yellow-brown product which has separated, is filtered with suction, extracted with boiling dilute hydrochloric acid in order to remove the aluminium salts and washed until neutral. It is further purified as indicated in Example 1.

(7) 80 parts of 2'-amino-4'-methyl-2-benzylbenzoic acid are dissolved in 800 parts of sulfuric acid (96%) and heated for 15 minutes at about 50° C. to about 55° C. The reaction product is poured into ice-water, the yellow-green precipitate is filtered with suction and washed until neutral. 1-amino-3-methyl-10-anthrone crystallizes from chlorobenzene in the form of yellow-brown needles melting at 196° C. to 197° C. It dissolves in concentrated sulfuric acid to a light yellow solution showing a weakly green fluorescence and in caustic soda solution to a yellow solution. On exposure to air or on addition of hydrogen superoxide, there separates from its alkaline solution 1-amino-3-methyl-anthraquinone melting at 193° C.

We claim:

1. The process which comprises causing an acid condensing agent to react with a compound of the general structure:

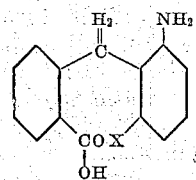

being unsubstituted in position X.

2. The process which comprises causing an acid condensing agent to react with 2'-amino-2-benzylbenzoic acid.

3. The process which comprises causing an acid condensing agent to react with 2'-amino-4-methyl-2-benzylbenzoic acid.

4. The process which comprises heating for about a quarter of an hour at a temperature of about 45° C. to about 65° C. a compound of the general structure:

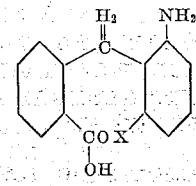

being unsubstituted in position X, which is dissolved in concentrated sulfuric acid.

5. The process which comprises heating for about a quarter of an hour at a temperature of about 45° C. to about 65° C. 2'-amino-2-benzylbenzoic acid which is dissolved in concentrated sulfuric acid.

6. The process which comprises heating for about a quarter of an hour at a temperature of about 45° C. to about 65° C. 2'-amino-4'-methyl-2-benzylbenzoic acid which is dissolved in concentrated sulfuric acid.

7. The process which comprises heating for about a quarter of an hour at a temperature of about 45° C. to about 50° C. a compound of the general structure:

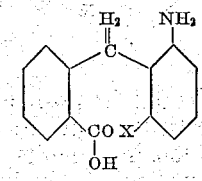

being unsubstituted in position X, which is dissolved in sulfuric acid monohydrate.

8. The process which comprises heating for about a quarter of an hour at a temperature of about 45° C. to about 50° C. 2'-amino-2-benzylbenzoic acid which is dissolved in sulfuric acid monohydrate.

9. The process which comprises heating for about a quarter of an hour at a temperature of about 45° C. to about 50° C. 2'-amino-4'-methyl-2-benzylbenzoic acid which is dissolved in sulfuric acid monohydrate.

10. The process which comprises heating for about a quarter of an hour at a temperature of about 45° C. to about 50° C. a compound of the general structure:

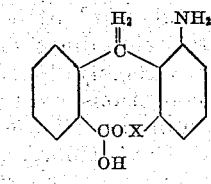

being unsubstituted in position X, which is dissolved in sulfuric acid monohydrate and treating the anthrone compound thus obtainable in an alkaline solution with an oxidizing agent.

11. The process which comprises heating for about a quarter of an hour at a temperature of about 45° C. to about 50° C. 2'-amino-2-benzylbenzoic acid which is dissolved in sulfuric acid monohydrate and treating the anthrone compound thus obtainable in an alkaline solution with an oxidizing agent.

12. The process which comprises heating for about a quarter of an hour at a temperature of about 45° C. to about 50° C. 2'-amino-4'-methyl-2-benzylbenzoic acid which is dissolved in sulfuric acid monohydrate and treating the anthrone compound thus obtainable in an alkaline solution with an oxidizing agent.

13. The compounds of the following general structure:

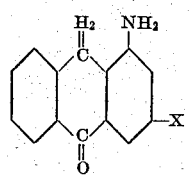

wherein X stands for hydrogen or alkyl, forming on exposure to air or addition of an oxidizing agent the corresponding anthraquinone compounds.

14. 1-amino-10-anthrone forming fine needles, melting at 172° C. to 173° C., dissolving in concentrated sulfuric acid to a light yellow solution showing a weakly green fluorescence and in caustic soda solution to a yellow solution and being transformed into the corresponding anthraquinone when its alkaline solution is exposed to air or treated with an oxidizing agent.

15. 1-amino-3-methyl-10-anthrone, crystallizing from chlorobenzene in the form of yellow-brown needles, melting at 196° C. to 197° C., dissolving in concentrated sulfuric acid to a light yellow solution showing a weakly green fluorescence and in caustic soda solution to a yellow solution and being transformed into the corresponding anthraquinone when its alkaline solution is exposed to air or treated with hydrogen superoxide.

GEORG KRÄNZLEIN.
ARTHUR WOLFRAM.
WALTER BROEKER.